(12) United States Patent
Liu (10) Patent No.: US 12,468,158 B2
(45) Date of Patent: Nov. 11, 2025

(54) OPTICAL SYSTEM AND HEAD MOUNT DISPLAY

(71) Applicant: GOERTEK OPTICAL TECHNOLOGY CO., LTD., Shandong (CN)

(72) Inventor: Fenglei Liu, Shandong (CN)

(73) Assignee: Goertek Optical Technology Co., Ltd., Weifang (CN)

( * ) Notice: Subject to any disclaimer, the term of this patent is extended or adjusted under 35 U.S.C. 154(b) by 0 days.

(21) Appl. No.: 18/681,297

(22) PCT Filed: Nov. 29, 2021

(86) PCT No.: PCT/CN2021/134056
§ 371 (c)(1),
(2) Date: Feb. 5, 2024

(87) PCT Pub. No.: WO2023/010728
PCT Pub. Date: Feb. 9, 2023

(65) Prior Publication Data
US 2024/0369842 A1 Nov. 7, 2024

(30) Foreign Application Priority Data
Aug. 4, 2021 (CN) .......................... 202110889089.1

(51) Int. Cl.
*G09G 5/00* (2006.01)
*G02B 27/00* (2006.01)
(Continued)

(52) U.S. Cl.
CPC ..... *G02B 27/0172* (2013.01); *G02B 27/0025* (2013.01); *G02B 27/10* (2013.01)

(58) Field of Classification Search
CPC . G02B 27/0172; G02B 27/0025; G02B 27/10
(Continued)

(56) References Cited

U.S. PATENT DOCUMENTS

2017/0010465 A1* 1/2017 Martinez ................ G02C 11/10
2017/0293144 A1* 10/2017 Cakmakci ............ G02B 27/017
(Continued)

FOREIGN PATENT DOCUMENTS

| CN | 107533228 A | 1/2018 |
|---|---|---|
| CN | 110045503 A | 7/2019 |
| CN | 113671708 A | 11/2021 |

*Primary Examiner* — Jennifer T Nguyen
(74) *Attorney, Agent, or Firm* — Baker Botts LLP (57) ABSTRACT

The present disclosure provides an optical system and a head mount device. The optical system comprises: a first lens, a correcting lens, a first extension, and a second extension, the first lens comprising a first surface and a second surface provided oppositely; the correcting lens provided on the docking end-face of the first lens and comprising a third surface which is docked with the first surface, and a fourth surface which is docked with the second surface; the first extension being integrally formed with the first lens or the correcting lens, extending to and covering a docking location between the first surface and the third surface, the second extension being integrally formed with the first lens or the correcting lens, extending to and covering a docking location between the second surface and the fourth surface.

10 Claims, 9 Drawing Sheets

(51) Int. Cl.
*G02B 27/01* (2006.01)
*G02B 27/10* (2006.01)

(58) Field of Classification Search
USPC .............................................. 345/8
See application file for complete search history.

(56) References Cited

U.S. PATENT DOCUMENTS

2021/0333557 A1* 10/2021 Qin .......................... G02B 5/04
2024/0004199 A1* 1/2024 Glik ................... G02B 27/0172

* cited by examiner

OPTICAL SYSTEM AND HEAD MOUNT DISPLAY

CROSS-REFERENCE TO RELATED APPLICATIONS

This application is a National Stage of International Application No. PCT/CN2021/134056, filed on Nov. 29, 2021, which claims priority to Chinese Patent Application No. 202110889089.1, filed on Aug. 4, 2021, both of which are hereby incorporated by reference in their entireties.

TECHNICAL FIELD

The present disclosure relates to the field of optical display technology, and in particular to an optical system and a head mount display.

BACKGROUND

A head mount display (HMD) provides an immersive virtual picture experience for a user. In order to reduce the size of the head mount display, a waveguide sheet is usually used to direct light from the location of the light source and to couple the light out from the waveguide sheet into human eyes. A single waveguide sheet is sometimes difficult to form a clear image, and it is necessary to splice other optical lenses on the basis of the waveguide sheet. However, a docking seam occurs between the waveguide sheet and the optical lens, and the light is deflected or scattered when passing through the docking seam. This docking seam is visible to the user when the user is wearing the head mount device, and therefore, when the user is viewing the picture, light deflected by the docking seam hinders the imaging effect of the picture.

SUMMARY

In view of the above, aiming at the problem that the light deflected by the docking seam hinders the imaging effect of the picture due to the docking seam generated between the waveguide sheet and the optical lens in the current head mount device, it is necessary to provide an optical system and a head mount display intended for avoiding the deflection or astigmatism of light caused by the seam and ensuring the imaging effect of the head mount device.

To achieve the above objective, the present disclosure proposes an optical system, comprising:

a first lens comprising a first surface and a second surface provided oppositely, the first lens further comprising a light input-coupling end-face and a docking end-face distal to the light input-coupling end-face, the light input-coupling end-face being connected to the first surface and the second surface, the docking end-face being connected to the first surface and the second surface, such that light being incident into the first lens from the light input-coupling end-face is reflected to the docking end-face via at least one of the first surface and the second surface;

a correcting lens provided on the docking end-face of the first lens, configured for correcting aberration and comprising a third surface which is docked with the first surface, and a fourth surface which is docked with the second surface; and a first extension and a second extension, the first extension being integrally formed with the first lens or the correcting lens, extending to and covering a docking location between the first surface and the third surface, the second extension being integrally formed with the first lens or the correcting lens, extending to and covering a docking location between the second surface and the fourth surface.

Optionally, the first lens, the correcting lens, the first extension, and the second extension are transparent media made of the same material.

Optionally, the first surface comprises a first endpoint distal to the correcting lens, the third surface comprises a third endpoint distal to the first lens, the second surface comprises a second endpoint distal to the correcting lens, and the fourth surface comprises a fourth endpoint distal to the first lens;

when the first extension is integrally formed with the correcting lens, the first extension extends from the third endpoint to the first endpoint;

when the first extension is integrally formed with the first lens, the first extension extends from the first endpoint to the third endpoint;

when the second extension is integrally formed with the correcting lens, the second extension extends from the fourth endpoint to the second endpoint;

when the second extension is integrally formed with the first lens, the second extension extends from the second endpoint to the fourth endpoint.

Optionally, a direction perpendicular to the first surface is defined as a thickness direction, in which the first extension and the second extension have the same thickness.

Optionally, the optical system further comprises:

a beam splitter lens provided on a side where the second surface of the first lens is located;

a phase retarder provided between the beam splitter lens and the first lens; and a polarization-reflecting film provided between the first lens and the correcting lens.

Optionally, the optical system further comprises a second lens which is a compensation lens, is configured to compensate for focal power of the beam splitter lens, and is provided between the beam splitter lens and the first lens, the phase retarder is provided on the second lens or the beam splitter lens, and the second lens is glued to the beam splitter lens and is spaced apart from the first lens.

Optionally, the beam splitter lens is a plane-concave lens, the second lens is a plano-convex lens, and a concave surface of the beam splitter lens is glued to a convex surface of the second lens.

Optionally, the phase retarder is a quarter-wave plate.

Optionally, the first surface and the second surface are parallel to each other, and the third surface and the fourth surface are parallel to each other.

In addition, for solving the above problem, the present disclosure further provides a head mount display comprising a display and the above optical system, and the display is provided on a light input-coupling end-face of the first lens.

In the technical solution provided by the present disclosure, the first lens is docked with the correcting lens, the docking location between the first surface and the third surface is defined as the first docking location, and the docking location between the second surface and the fourth surface is defined as the second docking location. By integrating the first extension with the first lens or the correcting lens and integrating the second extension with the first lens or the correcting lens, the first extension extending to and covering the first docking location, the second extension extending to and covering the second docking location, the docking installation of the first lens and the correcting lens becomes a docking of two optical surfaces without a docking seam visible to the user. When the light passes through the two optical surfaces where the first lens and the correcting lens are docked, the light can pass through them smoothly without scattering and deflection of the light. As a result, the docking seam location is not visible to the user, thereby ensuring the imaging effect of the light.

BRIEF DESCRIPTION OF THE DRAWINGS

In order to clearly illustrate embodiments of the present disclosure or technical solutions in the prior art, accompanying drawings that need to be used in description of the embodiments or the prior art will be briefly introduced as follows. Obviously, drawings in following description are only the embodiments of the present disclosure. For those skilled in the art, other drawings can also be obtained according to the disclosed drawings without creative efforts.

DESCRIPTION OF REFERENCE SIGNS

| 10 | First Lens | 220 | Fourth Surface |
| 110 | First Surface | 221 | Fourth Endpoint |
| 111 | First Endpoint | 230 | Glued End-Face |
| 120 | Second Surface | 310 | First Extension |
| 121 | Second Endpoint | 320 | Second Extension |
| 130 | Light Input-Coupling End-Face | 40 | Beam Splitter Lens |
| 140 | Docking End-Face | 50 | Second Lens |
| 20 | Correcting Lens | 60 | Display |
| 210 | Third Surface | 610 | Light |
| 211 | Third Endpoint | | |

The implementation of the objects, functional features and advantages of the present disclosure will be further described in connection with the embodiments, with reference to the accompanying drawings.

DETAILED DESCRIPTION

Technical solutions in the embodiments of the present disclosure are described below with reference to the accompanying drawings in the embodiments of the present disclosure. Apparently, the described embodiments are merely some rather than all of the embodiments of the present disclosure. All other embodiments, acquired by those of ordinary skill in the art based on the embodiments of the present disclosure without any creative work, should fall into the protection scope of the present disclosure.

It should be noted that all directional indications (such as up, down, left, right, front, back . . . ) in the embodiment of the present disclosure are used only to explain the relative positional relationship, movement, etc., between the parts in a particular attitude (as shown in the accompanying drawings), and the directional indications are changed accordingly if that particular attitude is changed.

In addition, terms "first" and "second" involved in the present disclosure are only used for descriptive purposes and should not be understood as indicating or implying relative importance or implying a number of indicated technical features. Therefore, a feature delimited with "first", "second" may expressly or implicitly include at least one of those features. In a description of the present disclosure, "a plurality" means at least two, such as two, three, etc., unless expressly and specifically defined otherwise.

In the present disclosure, unless expressly specified and limited otherwise, terms "connected", "fixed" and other terms should be interpreted in a broad sense, for example, it can be a fixed connection, a detachable connection, or an integrated: it can be a mechanical connection or an electrical connection: it can be directly connected, or indirectly connected through an intermediate medium, and it can be an internal communication between two elements or an interaction relationship between the two elements, unless otherwise explicitly defined. For those of ordinary skill in the art, specific meanings of the above terms in the present disclosure can be understood according to specific situations.

In addition, the technical solutions between the various embodiments of the present disclosure may be combined with each other, but it must be based on the fact that it can be realized by a person of ordinary skill in the art. When the combination of technical solutions appears to be contradictory or unattainable, it should be considered that such combination of technical solutions does not exist and is not within the scope of protection claimed in the present disclosure.

Figure 3:
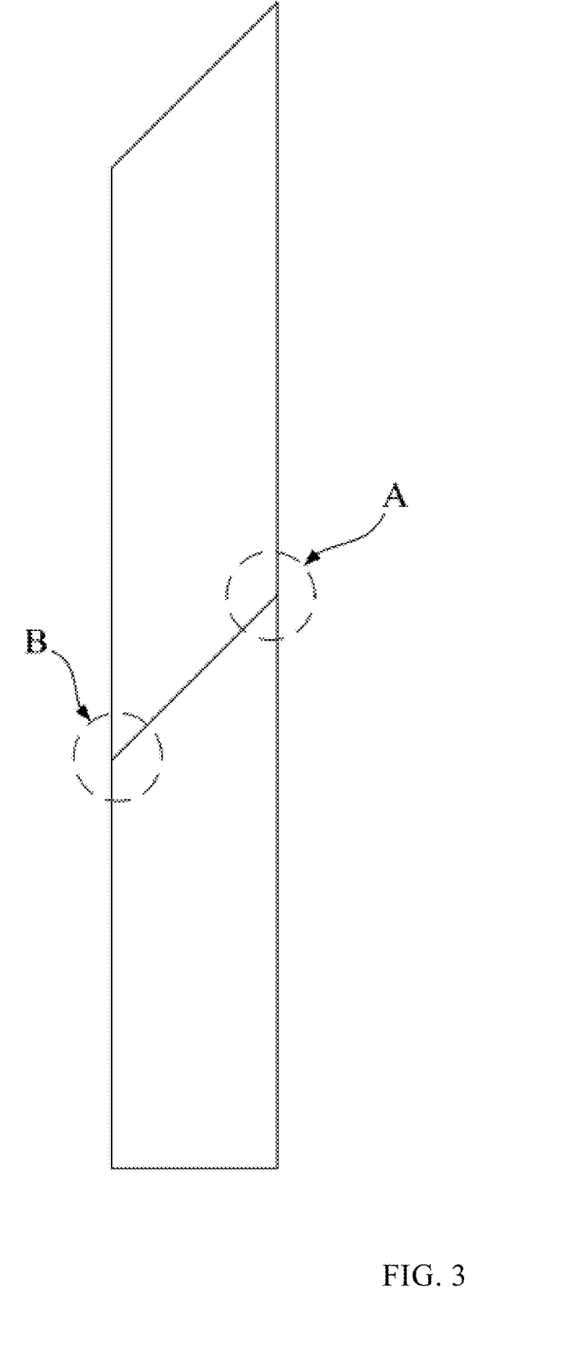
FIG. 3 is a schematic structural illustration of a docking position in the related art.

In the related art, in order to reduce the size of the head mount display, its thickness may be reduced by turning the optical path several times. Display principles of the head mount device comprise augmented reality (AR) display and virtual reality (VR) display. In order to reduce the size of the head mount display, a waveguide sheet is usually configured to direct the light from the location of a light source. Referring to FIG. 3, docking seams are generated between the waveguide sheet and the optical lens at locations A and B. The light is deflected or scattered as it passes through these locations of docking seams, and the user may see the docking seams between the waveguide sheet and the optical lens when wearing the head mount device, which hinder viewing of the user.

Figure 1:
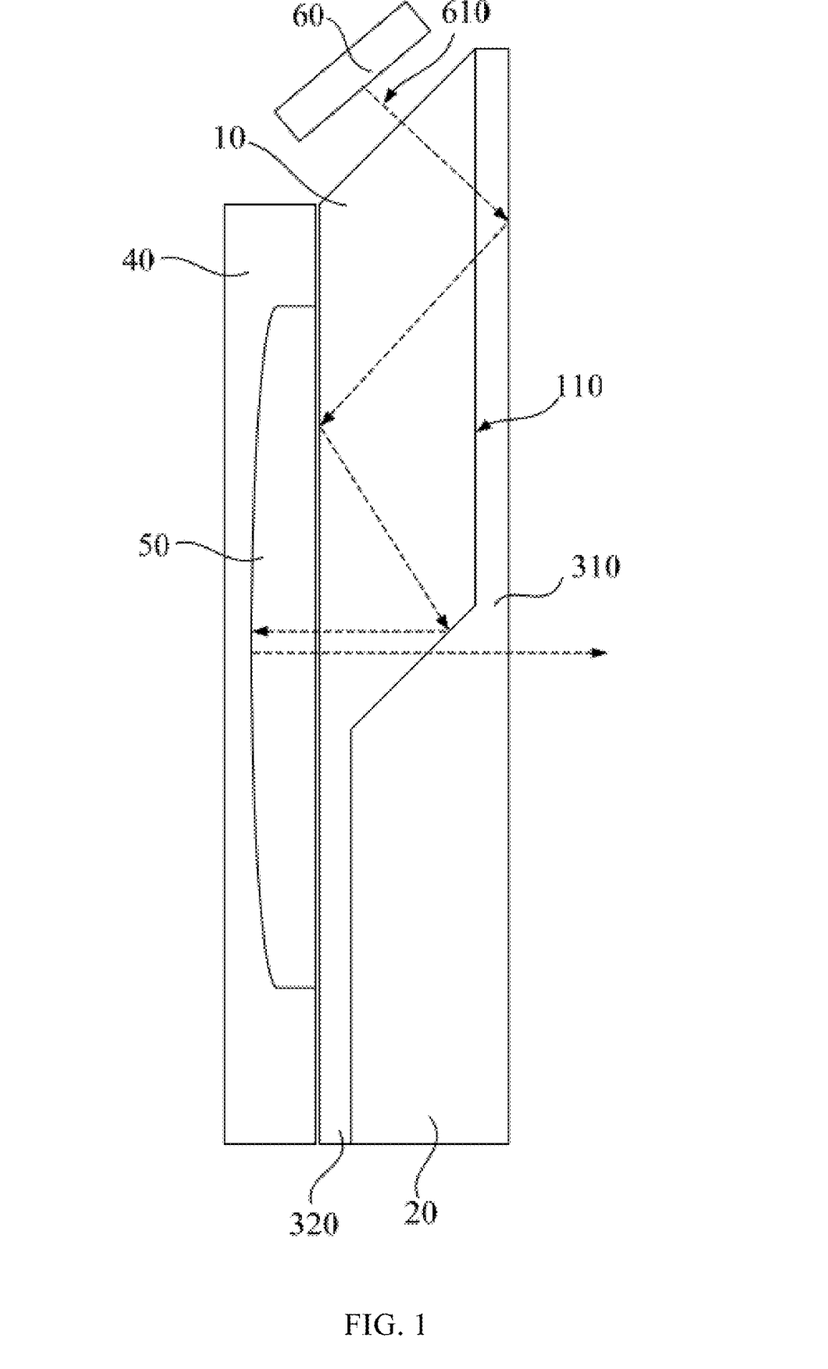
FIG. 1 is a schematic structural illustration of an optical system according to an embodiment of the present disclosure.
Figure 2:
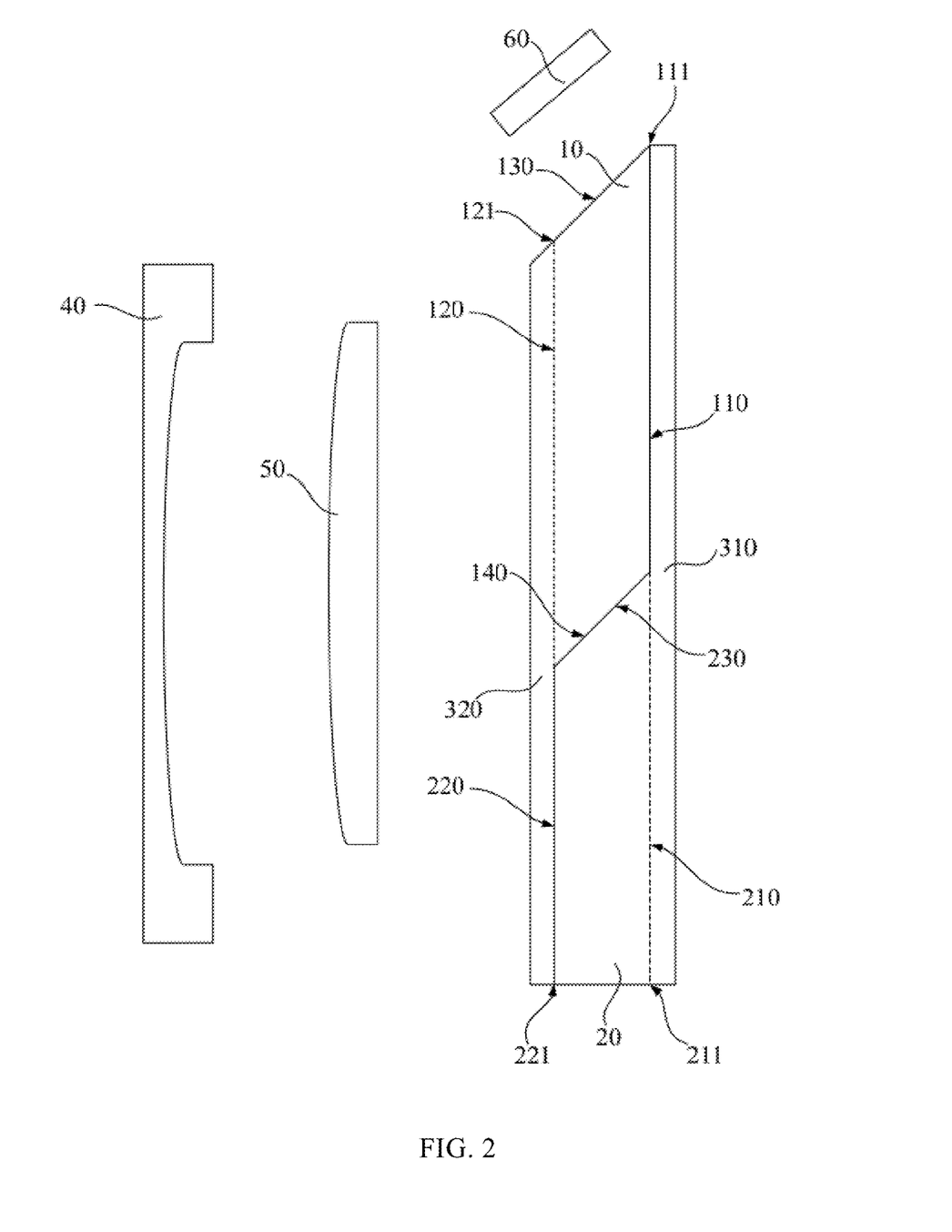
FIG. 2 is a schematic illustration of an exploded structure of the optical system of FIG. 1.
Figure 4:
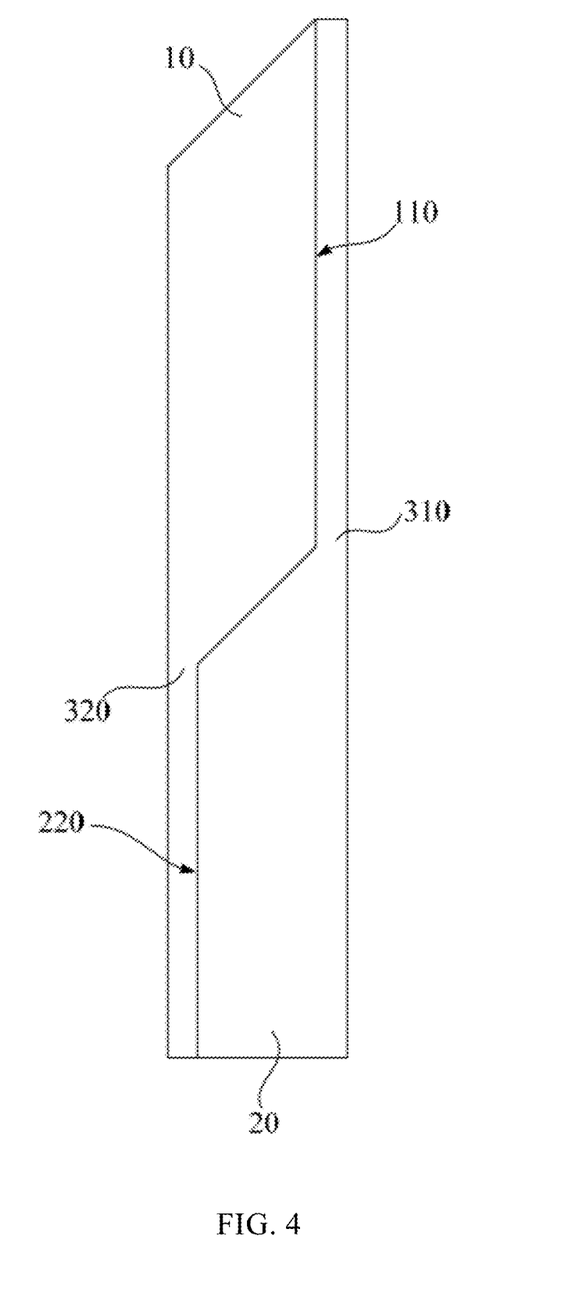
FIG. 4 is a schematic structural illustration of a first extension and a second extension according to a first embodiment of the present disclosure.

In order to solve the above problem, referring to FIGS. 1, 2 and 4, the present embodiment provides an optical system, comprising: a first lens 10, a correcting lens 20, a first extension 310, and a second extension 320. The first lens 10 is spliced with the correcting lens 20, and extends to and covers a splicing position between the first lens 10 and the correcting lens 20.

The first lens 10 comprises a first surface 110 and a second surface 120 provided oppositely. The first lens 10 further comprises a light input-coupling end-face 130 and a docking end-face 140 distal to the light input-coupling end-face 130.

The light input-coupling end-face 130 is connected to the first surface 110 and the second surface 120, the docking end-face 140 is connected to the first surface 110 and the second surface 120, and the light 610 is incident into the first lens 10 from the light input-coupling end-face 130, and is reflected to the docking end-face 140 by at least one of the first surface 110 and the second surface 120: the first lens 10 can be understood as a geometric waveguide sheet, the light is incident into the first lens 10 from the light input-coupling end-face 130, is transmitted into an optically thinner medium from an optically denser medium with an incident angle greater than or equal to a total reflection critical angle, and satisfies a total reflection condition of the light at the first surface. The light is reflected by the first surface 110 toward the second surface 120. Likewise, the light also satisfies the total reflection condition of the light at the second surface 120, and is reflected again by the second surface 120.

When the external light is transmitted to the waveguide structure, light in different colors will have different refractive indexes, which tends to lead to dispersion that can be understood as chromatic distortion being a kind of aberration. In order to reduce dispersion, a correcting lens 20 is provided on the docking end-face 140 of the first lens 10, is configured for correcting the aberration, and comprises a third surface 210 which is docked with the first surface 110 to generate a docking location therebetween. The correcting lens 20 further comprises a fourth surface 220 which is docked with the second surface 120 to generate a docking location therebetween. The first surface 110 and the third surface 210 face the user wearing the head mount device, and when the first extension 310 and the second extension 320 are not provided, the user wearing the head mount device can see the first docking location and the second docking location. Wherein, the correcting lens 20 comprises a glued end-face 230 facing toward the first lens 10, and when the first lens is spliced with the correcting lens 20, an optical glue is provided between the first lens 10 and the correcting lens 20, and the glued end-face 230 is docked with the docking end-face 140, so as to complete the gluing and fixing of the two.

The first extension 310 is integrally formed with the first lens 10 or the correcting lens 20, extends to and covers the docking location between the first surface 110 and the third surface 210. The second extension 320 is integrally formed with the first lens 10 or the correcting lens 20, and extends to and covers the docking location between the second surface 120 and the fourth surface 220. By covering the first docking location with the first extension 310 and covering the second docking location with the second extension 320, as well as integrating the first extension 310 and second extension 320 separately, the direction of the docking seams of the first lens 10 and the correcting lens 20 is changed to extend in the vertical direction so as not to hinder the view of the user.

In the proposed technical solution, the first lens 10 and the second lens 20 are docked, the docking location between the first surface 110 and the third surface 210 forms a first docking location, and the docking position between the second surface 120 and the fourth surface 220 forms a second docking location. By integrating the first extension 310 with the first lens 10 or the correcting lens 20, and integrating the second extension 320 with the first lens 10 or the correcting lens 20, extending the first extension 310 to and covering the first docking location and extending the second extension 320 to and covering the second docking location, the docking installation of the first lens 10 and the correcting lens 20 becomes a docking of two optical surfaces without a docking location. When the light passes through the two optical surfaces where the first lens 10 and the correcting lens 20 are docked, the light can pass through them smoothly without scattering and deflection of the light. As a result, the user's field of view cannot observe the docking location, thereby ensuring the imaging effect of the light.

In the above embodiment, in order to ensure that the light can be totally reflected smoothly at the first docking location and the second docking location, the first lens 10, the correcting lens 20, the first extension 310, and the second extension 320 are transparent media made of the same material. For example, if the first lens 10 is optical glass, the correcting lens 20 is also the same optical glass, and the first extension 310 and the second extension 320 are also optical glass made of the same material. If the first lens 10 is optical plastic, the correcting lens 20 is also the same optical plastic, and the first extension 310 and the second extension 320 are also optical plastics made of the same material. Since all three are made of the same material and have the same refractive index, the light will not be reflected or refracted after passing through the first surface 110 at the first docking location but will continue to be transmitted toward the first extension 310, and is totally reflected at the outer surface of the first extension 310 so that the light is transmitted toward the second surface 120. Similarly, the light will not be reflected or refracted either after passing through the second surface 120 at the second docking location but will continue to be transmitted toward the second extension 320, and is totally reflected at the outer surface of the second extension 320 so that the light is transmitted toward the docking end-face 140 of the first lens 10.

In the above embodiment, the setting positions of the first extension 310 and the second extension 320 include at least the following four cases. In the first case, referring to FIG. 4, the first extension 310 is integrally formed with the correcting lens 20, and the second extension 320 is integrally formed with the first lens 10.

Figure 5:
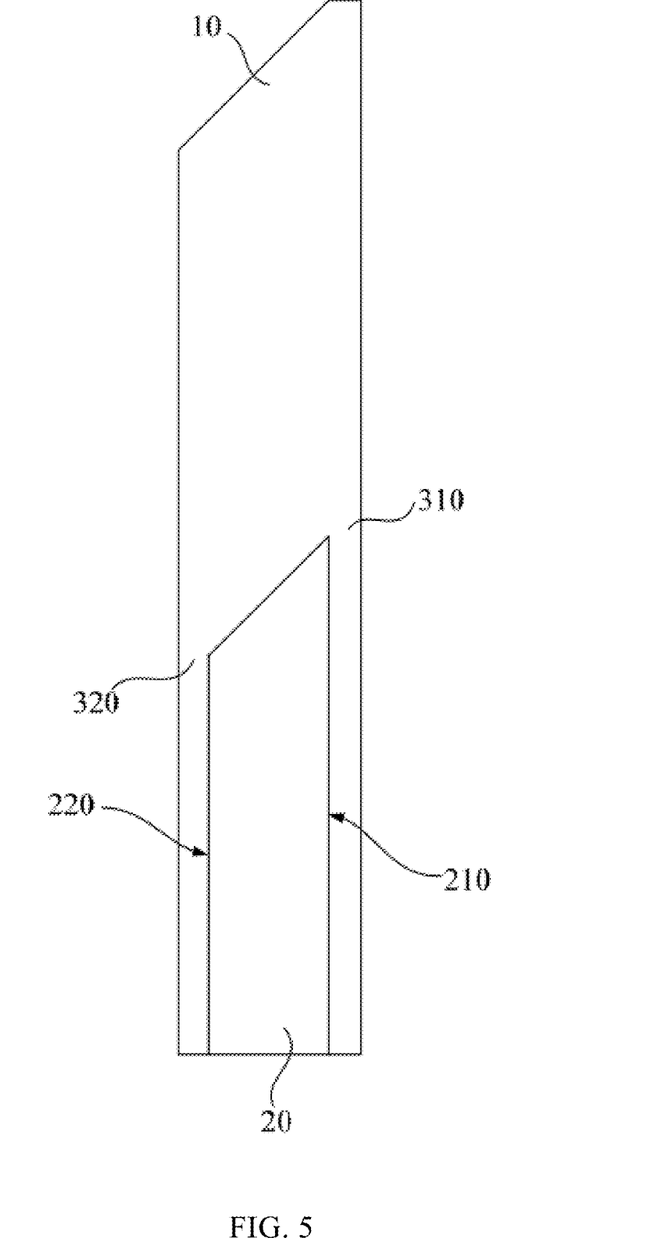
FIG. 5 is a schematic structural illustration of the first extension and the second extension according to a second embodiment of the present disclosure.

In the second case, referring to FIG. 5, the first extension 310 is integrally formed with the first lens 10, and the second extension 320 is integrally formed with the first lens 10.

Figure 6:
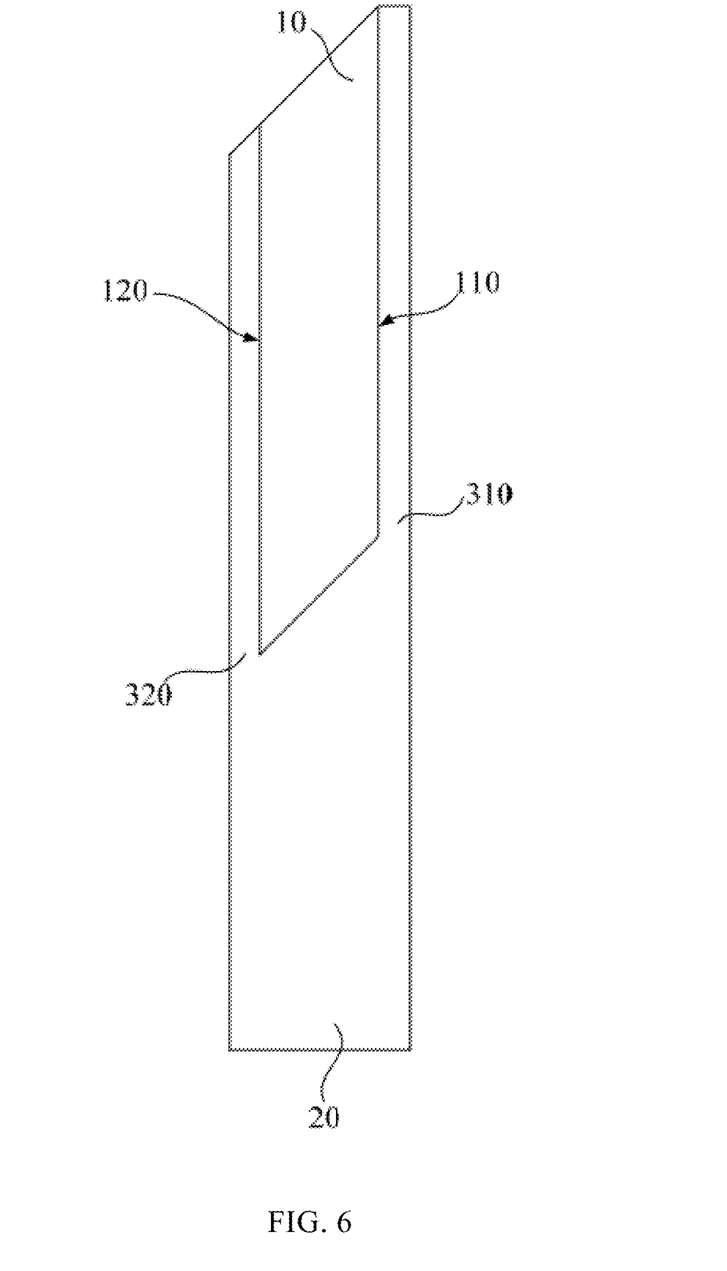
FIG. 6 is a schematic structural illustration of the first extension and the second extension according to a third embodiment of the present disclosure.

In the third case, referring to FIG. 6, the first extension 310 is integrally formed with the correcting lens 20, and the second extension 320 is integrally formed with the correcting lens 20.

Figure 7:
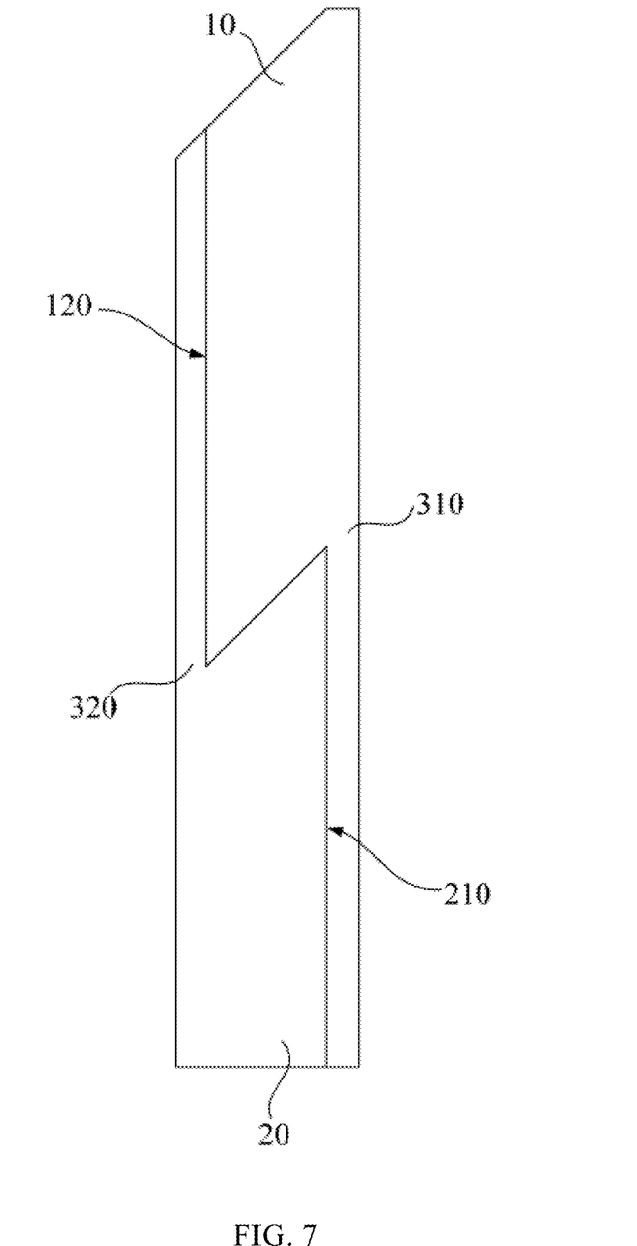
FIG. 7 is a schematic structural illustration of the first extension and the second extension according to a fourth embodiment of the present disclosure.

In the fourth case, referring to FIG. 7, the first extension 310 is integrally formed with the first lens 10, and the second extension 320 is integrally formed with the correcting lens 20.

In the above embodiment, the first surface 110 comprises a first endpoint 111 distal to the correcting lens 20, the third surface 210 comprises a third endpoint 211 distal to the first lens 10, the second surface 120 comprises a second endpoint 121 distal to the correcting lens 20, and the fourth surface 220 comprises a fourth endpoint 221 distal to the first lens 10.

In order to ensure that the structure formed by the first lens 10 and the correcting lens 20 is simple and easy to install, the first extension 310 and the second extension 320 evenly cover the surfaces of the first lens 10 and the correcting lens 20. Here, when the first extension 310 is integrally formed with the correcting lens 20, the first extension 310 extends from the third endpoint 211 to the first endpoint 111: when the first extension 310 is integrally formed with the first lens 10, the first extension 310 extends from the first endpoint 111 to the third endpoint 211. Therefore, the first extension 310 may be connected to the correcting lens 20 or the first lens 10. At this time, the first extension 310 is placed over the first surface 110 and the third surface 210.

In addition, when the second extension 320 is integrally formed with the correcting lens 20, the second extension 320 extends from the fourth endpoint 221 to the second endpoint 121: when the second extension 320 is integrally formed with the first lens 10, the second extension 320 extends from the second endpoint 121 to the fourth endpoint 221. Therefore, the second extension 320 may be connected to the correcting lens 20 or the first lens 10. At this time, the second extension 320 is placed over the second surface 120 and the fourth surface 220. The splicing location cannot be observed from either the user's field of view or an external field of view, and the first lens 10 and the correcting lens 20 seems to constitute a square shape as a whole, so that the structure is more regular and easier to install.

Moreover, the first extension 310 and the second extension 320 are integrated with the first lens 10 and the correcting lens 20, respectively. With the integrated setting, only two optical devices exist. In this way, when all four of the first lens 10, the correcting lens 20, the first extension 310, and the second extension 320 are assembled together, the assembly can be completed with a single docking, thereby improving assembly productivity.

In the above embodiment of the present application, the direction perpendicular to the first surface 110 is defined as the thickness direction, in which the first extension 310 and the second extension 320 have the same thickness, so as to ensure that the traveled distances of the light by the total reflection of the first surface 110 and the second surface 120 are equal, and it is also convenient for processing.

Figure 8:
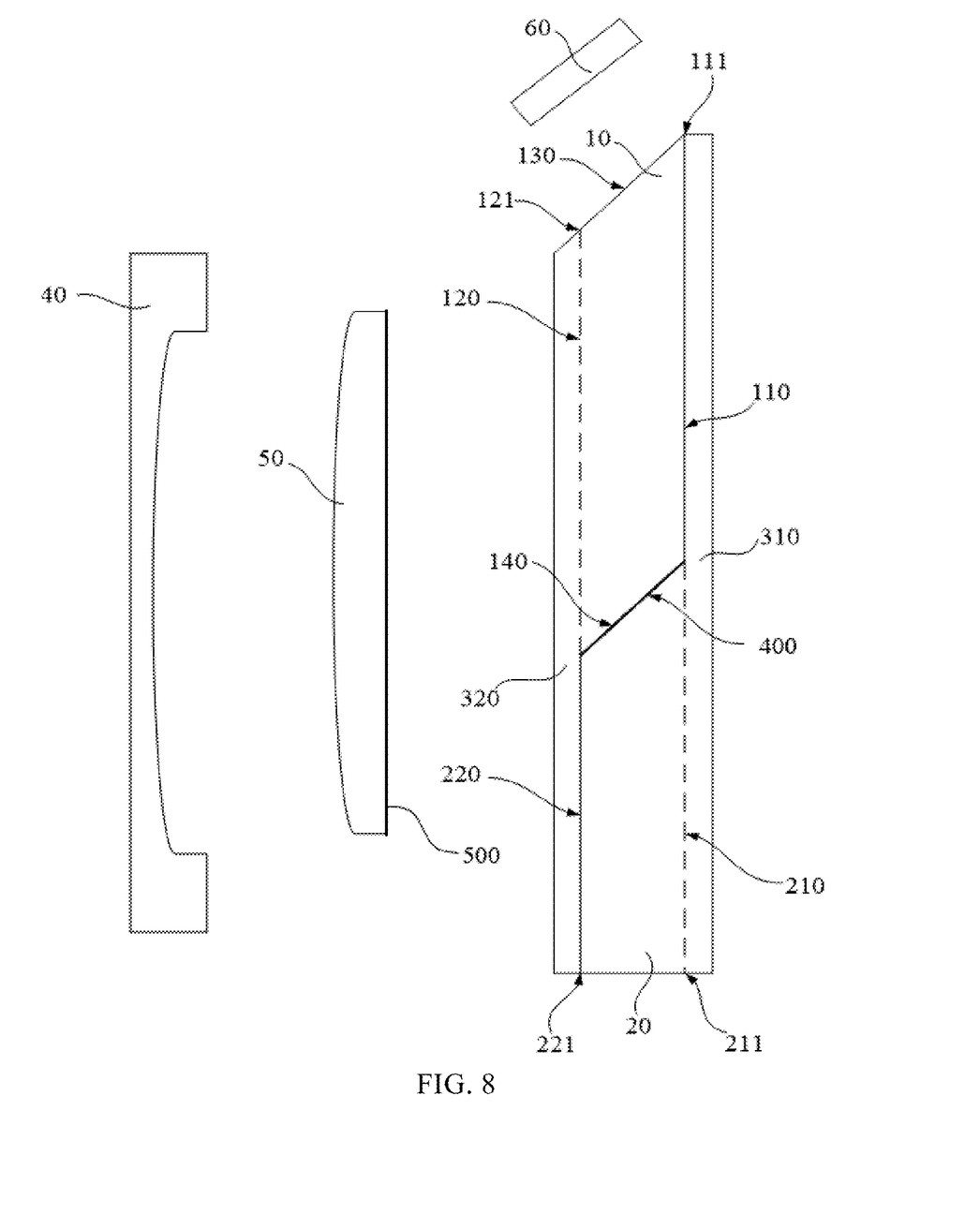
FIG. 8 is a schematic illustration of an exploded structure of another optical system.
Figure 9:
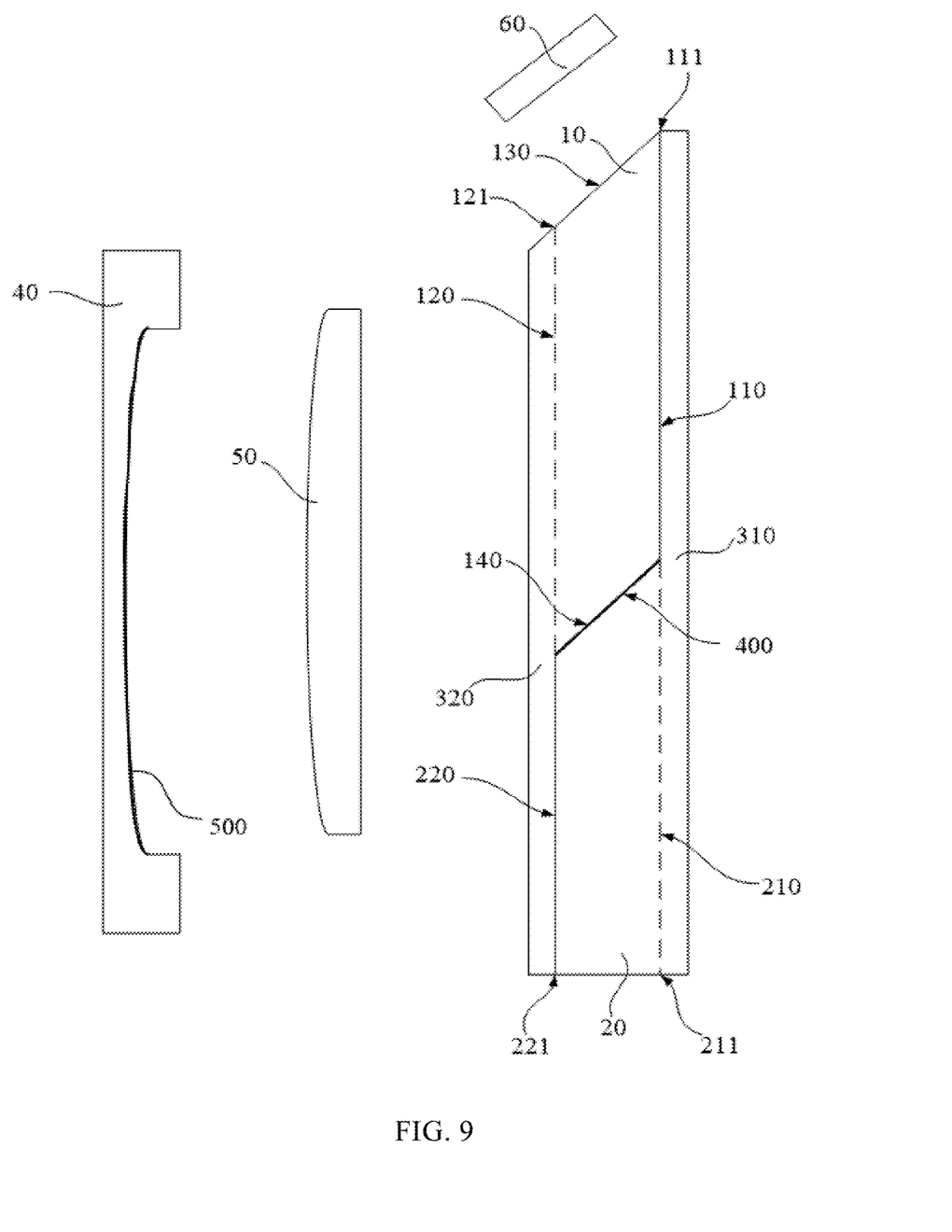
FIG. 9 is a schematic illustration of an exploded structure of yet another optical system.

In one of the embodiments of the present disclosure, in order to reduce the size of the optical system, refraction and reflection of the optical path are adopted. Specifically, the optical system further comprises a beam splitter lens 40, a phase retarder 500, and a polarization-reflecting film 400. The beam splitter lens 40 is provided on a side where the second surface 120 of the first lens 10 is located: the phase retarder 500 is provided between the beam splitter lens 40 and the first lens 10; the polarization-reflecting film 400 is provided between the first lens 10 and the correcting lens 20. The light enters into the first lens 10 from the light input-coupling end-face 130, is totally reflected between the first surface 110 and the second surface 120, and is transmitted toward the docking end-face. When the light is incident into the docking end-face for the first time, the polarization direction of the light is orthogonal to the transmission axis direction of the polarization-reflecting film 400 of the docking end-face, and the light is reflected toward the second surface 120. After the light is transmitted out of the first lens 10, it passes through the phase retarder 500 and is converted into the circularly polarized light. Further, the light is reflected after passing through the beam splitter lens 40, and thus the polarization handedness of the circularly polarized light changes from left-handed rotation to right-handed rotation or from right-handed rotation to left-handed rotation. After the light passed through the phase retarder 500 again, it is converted from a circularly polarized state to a linearly polarized state, and when the linearly polarized light is incident into the polarization-reflecting film 400 of the docking end-face for the second time, the polarization direction of the light is the same as the transmission axis direction of the polarization-reflecting film 400 and the light is transmitted through the first lens 10 into the human eyes. It can be seen that the light is refracted and reflected many times, thereby reducing the size of the optical system. It will be appreciated that the polarization-reflecting film 400 may also be provided on the correcting lens 20, may be a polarization-reflecting film 400 attached to the correcting lens 20 or a laminated film structure directly electroplated on the correcting lens 20.

Further, the phase retarder 500 is a quarter-wave plate capable of converting the linearly polarized light into circularly polarized light and also converting the circularly polarized light into the linearly polarized light.

In one of embodiments of the present disclosure, the optical system is applied to an AR display, and for this reason, the internal light needs to be converged or diffused, and thus the beam splitter lens 40 has a certain focal power. Besides, the AR display also requires external light to enter into the interior of the head-mounted display. In order to ensure that the external light can smoothly enter the human eyes in parallel, it is necessary to compensate the focal power of the beam splitter lens 40. Here, the optical system further comprises a second lens 50, which is a compensation lens, is configured to compensate for the focal power of the beam splitter lens 40, and is provided between the beam splitter lens 40 and the first lens 10. The phase retarder 500 is provided on the second lens 50 or the beam splitter lens 40, the beam splitter lens 40 is glued to the second lens 50, and the second lens 50 is spaced apart from the first lens 10. The second lens 50 is configured to compensate the optical power of the beam splitter lens 40, and if the optical power of the beam splitter lens 40 is positive, the optical power of the second lens 50 is negative. Otherwise, if the optical power of the beam splitter lens 40 is negative, the optical power of the second lens 50 is positive.

In one of embodiments of the present disclosure, the beam splitter lens 40 is a plane-concave lens, the second lens 50 is a plano-convex lens, and a concave surface of the beam splitter lens 40 is glued to a convex surface of the second lens 50. Here, the concave surface of the plane-concave lens faces toward the second lens 50, and is provided with a beam splitting films. The beam splitting film comprises a transflective film which may be pasted on the concave surface of the plane-concave lens, and may also be coated. The way of pasting is simple and easy to operate. The way of coating may improve the compactness and firmness of the film. Both the phase retarder 500 and the beam splitting film may be provided on the beam splitter lens 40. Furthermore, the plano-convex lens has a convex surface facing toward the beam splitter lens 40 and a planar surface distal to the beam splitter lens 40. The phase retarder 500 may also be provided on a convex surface of the plano-convex lens or on a planar surface of the plano-convex lens. The phase retarder 500 is a laminated film structure. For example, the phase retarder 500 may be pasted on the convex surfaces of the plano-convex lens, and may also be coated. The way of pasting is simple and easy to operate. The way of coating may improve the compactness and firmness of the film.

In one of embodiments of the present disclosure, the first surface 110 and the second surface 120 are parallel to each other, and the third surface 210 and the fourth surface 220 are parallel to each other. To ensure that the incident angle satisfies the total reflection critical angle when the light is reflected between the first surface 110 and the second surface 120, the first surface 1101 and the second surface 120 are provided in parallel, and similarly, the third surface 210 and the fourth surface 220 are arranged in parallel. In addition, the extension direction of the light input-coupling end-face 130 is gradually away from second lens 50. In other words, the angle between the light input-coupling end-face 130 and the first surface 110 is an acute angle, and the angle between the light input-coupling end-face 130 and the second surface 120 is an obtuse angle. Further, the light input-coupling end-face 130 and the first glued end-face 140 are also provided in parallel. It can be seen that the angle between the docking end-face 140 and the first surface 110 is an obtuse angle, and the angle between the docking end-face 140 and the second surface 120 is an acute angle.

The disclosure also provides a head mount display comprising a display 60 provided on the light input-coupling end-face 130 of the first lens 10, and the optical system as described above. The light 610 transmitted by the display 60 is the linearly polarized light, and the light 610 in the linearly polarized state is transmitted into the light input-coupling end-face 130 of the first lens 10 and is transmitted into the first surface 110.

The implementation of the head mount display of the present disclosure may be referred to the various embodiments of the optical system described above, and no further elaboration is needed here.

The above are only preferred embodiments of the present disclosure, and are not intended to limit the patent scope of the present disclosure. Any equivalent structural transformations made by utilizing the specification of the present disclosure and the accompanying drawings under the concept of the present disclosure or direct/indirect application thereof in other related technical fields shall be included in the scope of patent protection of the present disclosure.

The invention claimed is:

1. An optical system, comprising:
   a first lens comprising a first surface and an opposite second surface, the first lens further comprising a light input-coupling end-face and a docking end-face distal to the light input-coupling end-face, the light input-coupling end-face being connected to the first surface and the second surface, the docking end-face being connected to the first surface and the second surface, such that light being incident into the first lens from the light input-coupling end-face is adapted to be reflected to the docking end-face via at least one of the first surface and the second surface;
   a correcting lens provided on the docking end-face of the first lens, configured for correcting an aberration and comprising a third surface adapted to be docked with the first surface, and a fourth surface adapted to be docked with the second surface;
   a first extension integrally formed with the first lens or the correcting lens, extending to and covering a docking location between the first surface and the third surface;
   a second extension integrally formed with the first lens or the correcting lens, extending to and covering a docking location between the second surface and the fourth surface,
   a beam splitter lens provided on a side where the second surface of the first lens is located, configured to reflect the light and having a focal power;
   a second lens comprising a compensation lens, configured to compensate for the focal power of the beam splitter lens, and provided between the beam splitter lens and the first lens;
   a phase retarder provided between the beam splitter lens and the first lens; and
   a polarization-reflecting film provided between the first lens and the correcting lens.

2. The optical system according to claim 1, wherein the first lens, the correcting lens, the first extension, and the second extension are transparent media made of the same material.

3. The optical system according to claim 1, wherein the first surface comprises a first endpoint distal to the correcting lens, the third surface comprises a third endpoint distal to the first lens, the second surface comprises a second endpoint distal to the correcting lens, and the fourth surface comprises a fourth endpoint distal to the first lens;
   when the first extension is integrally formed with the correcting lens, the first extension extends from the third endpoint to the first endpoint;
   when the first extension is integrally formed with the first lens, the first extension extends from the first endpoint to the third endpoint;
   when the second extension is integrally formed with the correcting lens, the second extension extends from the fourth endpoint to the second endpoint;
   when the second extension is integrally formed with the first lens, the second extension extends from the second endpoint to the fourth endpoint.

4. The optical system according to claim 1, wherein a direction perpendicular to the first surface is defined as a thickness direction, in which the first extension and the second extension have the same thickness.

5. The optical system according to claim 1, wherein the phase retarder is provided on the second lens or the beam splitter lens, and the second lens is glued to the beam splitter lens and is spaced apart from the first lens.

6. The optical system according to claim 5, wherein the beam splitter lens is a plane-concave lens, the second lens is a plano-convex lens, and a concave surface of the beam splitter lens is glued to a convex surface of the second lens.

7. The optical system according to claim 1, wherein the phase retarder is a quarter-wave plate.

8. The optical system according to claim 1, wherein the first surface and the second surface are parallel to each other, and the third surface and the fourth surface are parallel to each other.

9. A head mount display comprising a display and the optical system according to claim 1, the display is provided on a light input-coupling end-face of a first lens.

10. The optical system according to claim 1, configures such that when the light is incident into the docking end-face for a first time, a polarization direction of the light is orthogonal to a transmission axis direction of the polarization-reflecting film, the light is reflected toward the second surface, the light is transmitted out of the first lens, passes through the phase retarder and is converted into circularly polarized light, then the light is reflected by the beam splitter lens, passes through the phase retarder again, and is converted from a circularly polarized state to a linearly polarized state, the light is incident into the docking end-face for a second time, the polarization direction of the light is the same as the transmission axis direction, and the light is transmitted out of the first lens.

* * * * *